United States Patent
Kim et al.

(10) Patent No.: US 8,565,827 B2
(45) Date of Patent: Oct. 22, 2013

(54) METHOD AND APPARATUS FOR POWER SAVING IN WIRELESS COMMUNICATION NODE B

(75) Inventors: Soo-Jong Kim, Seoul (KR); Seung-Joo Maeng, Seongnam-si (KR); Jee-Woong Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 20 days.

(21) Appl. No.: 13/025,962

(22) Filed: Feb. 11, 2011

(65) Prior Publication Data

US 2011/0195741 A1 Aug. 11, 2011

(30) Foreign Application Priority Data

Feb. 11, 2010 (KR) .................. 10-2010-0012856

(51) Int. Cl.
*H04M 1/00* (2006.01)

(52) U.S. Cl.
USPC .................................... 455/562.1; 455/127.5

(58) Field of Classification Search
USPC ........ 455/561, 562.1, 574, 575.7, 552.1, 522, 455/452.1, 452.2, 127.5, 127.1
See application file for complete search history.

(56) References Cited

U.S. PATENT DOCUMENTS

| | | | | |
|---|---|---|---|---|
| 6,662,024 | B2 * | 12/2003 | Walton et al. | 455/562.1 |
| 7,184,743 | B2 * | 2/2007 | Walton et al. | 455/343.4 |
| 7,191,381 | B2 * | 3/2007 | Gesbert et al. | 714/759 |
| 8,081,698 | B2 * | 12/2011 | Xu et al. | 375/267 |
| 8,140,122 | B2 * | 3/2012 | Park et al. | 455/561 |
| 8,259,848 | B2 * | 9/2012 | Malladi | 375/298 |
| 2010/0296591 | A1 * | 11/2010 | Xu et al. | 375/259 |
| 2012/0149411 | A1 * | 6/2012 | Miyoshi et al. | 455/501 |

OTHER PUBLICATIONS

Hongseok Kim; Chan-Byoung Chae; de Veciana, G.; Heath, R.W. Information Sciences and Systems, 2008. CISS 2008. 42nd Annual Conference on Digital Object Identifier: 10.1109/CISS.2008. 4558497 Publication Year: 2008 , pp. 68-73.*

* cited by examiner

*Primary Examiner* — Sonny Trinh

(57) ABSTRACT

A method and an apparatus reduce power used when a traffic load is low in a base station of a wireless communication system. The base station monitors a traffic load. When the traffic load is lower than a predetermined threshold and a Multiple Input Multiple Output (MIMO) mode is used to communicate with a mobile station, the MIMO mode is converted to a Single Input Multiple Output (SIMO) mode. The base station performs communication with the mobiles stations by using the SIMO mode. According to another embodiment, when the traffic load is lower than a predetermined threshold, the base station limits the number of Resource Blocks (RBs) that may be allocated to a coverage area of the base station. A Power Amplifier (PA) bias related to a transmission output of the base station is reduced based on the limited number of RBs, thereby saving power consumption of the base station.

20 Claims, 5 Drawing Sheets

METHOD AND APPARATUS FOR POWER SAVING IN WIRELESS COMMUNICATION NODE B

CROSS-REFERENCE TO RELATED APPLICATION(S) AND CLAIM OF PRIORITY

The present application is related to and claims priority under 35 U.S.C. §119(a) to a Korean Patent Application entitled "Method and Apparatus for Power Saving in Wireless Communication Node B" filed in the Korean Industrial Property Office on Feb. 11, 2010 and assigned Serial No. 10-2010-0012856, the contents of which are incorporated herein by reference.

TECHNICAL FIELD OF THE INVENTION

The present invention relates to a wireless communication system and, more particularly, to a method and an apparatus for reducing power consumption in a wireless communication base station.

BACKGROUND OF THE INVENTION

In general, a cellular wireless communication system divides the entire coverage into a plurality of cells and covers the cells through Node Bs or Base Stations (BSs), respectively, such that it supports uninterrupted continuous communication of Mobile Stations (MSs) or User Equipment (UE), moving between cells.

The BS includes a modem that performs a digital communication processing and a Radio Frequency (RF) unit that performs an RF signal processing. The BS performs traffic processing requested by a plurality of MSs placed in a cell. The traffic processing is completed through an available Resource Block (RB) in the BS. That is, one or more RBs are allocated to a cell which is covered by the BS or to each sector which is included in the cell, and a separate transmission/reception path is normally required for each RB.

Meanwhile, according to the increase in demand for a high capacity data service such as a variety of multimedia internet services, as well as a voice call in a wireless communication market, a variety of wireless transmission technologies have been developed in order to satisfy the demand. Research on MIMO technology, which is one of the wireless transmission technologies, is currently an attractive field. Because the MIMO system uses multiple antennas at its transmission/reception port, respectively, the MIMO system may increase a channel transmitting capacity in proportion to the number of antennas without an additional allocation of transmission power or frequency, in comparison with a system that utilizes a single antenna.

The MIMO technology uses a plurality of transmission/reception antennas such that it additionally utilizes a transmission/reception path that corresponds to each of the transmission/reception antennas, thereby largely increasing power consumption of the BS.

Recently, as the interest in the environment and energy efficiency has increased, the demand for not only the MS using a battery with a limited capacity but a variety of technologies for reducing unnecessary power consumption in the BS has increased. Accordingly, the technology for preventing the use of unnecessary power and reducing power consumption in the BS of the wireless communication system is required.

SUMMARY OF THE INVENTION

To address the above-discussed deficiencies of the prior art, it is a primary object to provide a method and an apparatus for reducing power consumption in a BS of a wireless communication system.

The present invention provides a method and an apparatus for solving a problem in that power more than necessary power is used when a traffic load is low in the wireless communication BS.

The present invention provides a method and an apparatus for reducing power used when a traffic load is low in the wireless communication BS.

In accordance with an aspect of the present invention, there is provided a method for saving power in a base station of a wireless communication system. The method includes monitoring a traffic load of the base station. When the traffic load is lower than a predetermined threshold and a Multiple Input Multiple Output (MIMO) mode is used to communicate with a mobile station, the MIMO mode is converted to a Single Input Multiple Output (SIMO) mode. And communication is performed with the mobile station by using the SIMO mode.

In accordance with another aspect of the present invention, there is provided a method for saving power in a base station of a wireless communication system. The method includes monitoring a traffic load of the base station. When the traffic load is lower than a predetermined threshold, a number of Resource Blocks (RBs) that may be allocated for a coverage area of the base station is limited. And a Power Amplifier (PA) bias is reduced with regard to a transmission output of the base station based on the limited number of RBs.

In accordance with another aspect of the present invention, there is provided an apparatus in a base station of a wireless communication system. The apparatus includes a power saving determiner for monitoring a traffic load of the base station. When the traffic load is lower than a predetermined threshold and a Multiple Input Multiple Output (MIMO) mode is used in order to communicate with a mobile station, the power saving determiner converts the MIMO mode to a SIMO mode. And a transmission/reception unit performs communication with the mobile station by using the SIMO mode.

In accordance with yet another aspect of the present invention, there is provided an apparatus in a base station of a wireless communication system. The apparatus includes a power saving determiner for monitoring a traffic load of the base station. When the traffic load is lower than a predetermined threshold, the power saving determiner limits a number of RBs that may be allocated to a coverage area of the base station. And a transmission/reception unit reduces a PA bias related to a transmission output of the base station based on the limited number of RBs.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. In the following description, a detailed explanation of known related functions and constitutions may be omitted to avoid unnecessarily obscuring the subject matter of the present invention.

Figure 1:
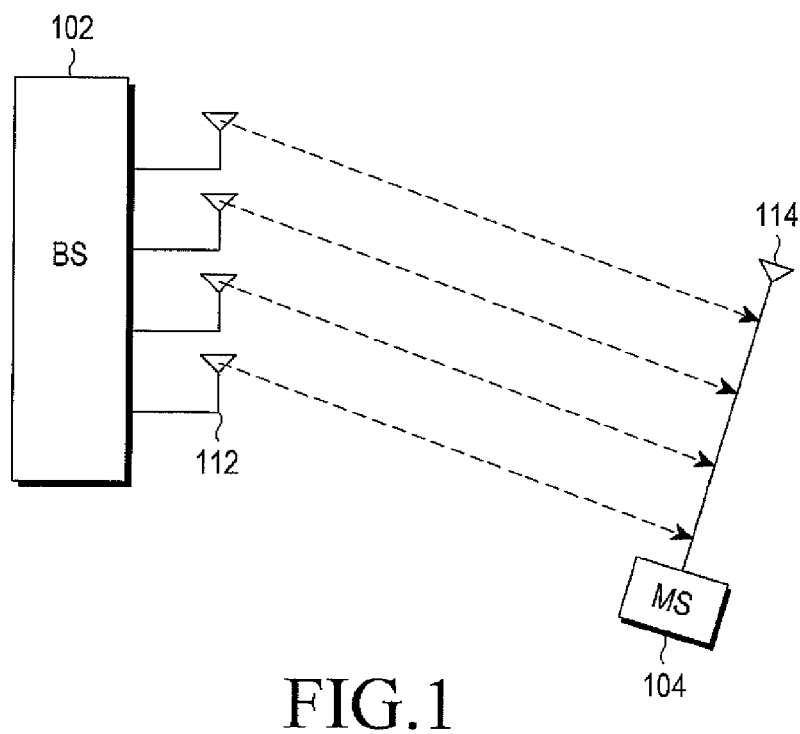
FIG. 1 illustrates a BS that uses MIMO technology according to an embodiment of the present invention.

FIG. 1 illustrates a BS that uses MIMO technology according to an embodiment of the present invention.

As illustrated in FIG. 1, the BS 102 includes a plurality of transmission (Tx) antennas 112, and transmits data to an MS 104 by using at least one of the Tx antennas 112. The MS 104 may include one reception (Rx) antenna 114 or a plurality of Rx antennas 114, and receives data transmitted from the BS 102 by using at least one of the plurality of Rx antennas 114. When the BS 102 transmits data to the MS 104, the BS 102 may determine whether to use the plurality of Tx antennas 112 or one of the Tx antennas 112.

The mode of using a plurality of Tx antennas is referred to as a Multiple Input Multiple Output (MIMO) mode, and a the mode of using one Tx antenna is referred to as a Single Input Multiple Output (SIMO) mode. The BS 102 may determine whether to use the MIMO mode or the SIMO mode for the MS 104 based on several factors such as a channel condition of the MS 104, slack resources of the BS 102, and such.

Figure 2:
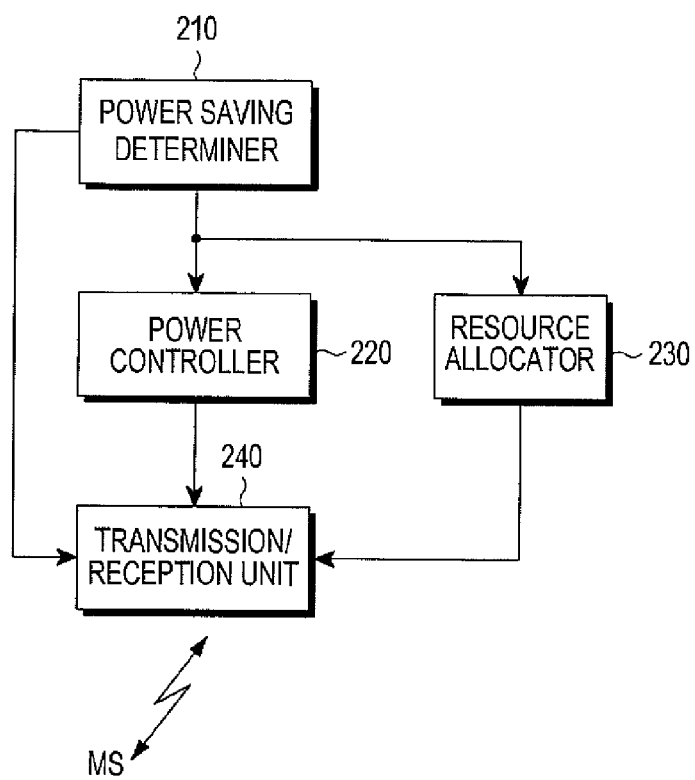
FIG. 2 illustrates a BS according to an embodiment of the present invention.

FIG. 2 illustrates a BS according to an embodiment of the present invention. As illustrated in FIG. 2, the BS includes a power saving determiner 210, power controller 220, a resource allocator 230, and a transmission/reception unit 240.

Here, it is noted that a structure of the BS, which is not related to the principal subject matter of the present invention, is omitted.

Referring to FIG. 2, the power saving determiner 210 determines whether to use a power saving mode based on a setup by a system operator, power consumption of the BS, a traffic load, and such, and informs the power controller 220, the resource allocator 230, and the transmission/reception unit 240 of a determination result. In an embodiment, the power saving determiner 210 monitors the traffic load by verifying the number of calls and an amount of radio resources allocated to each call (i.e., the number of resource blocks, antennas, and such) and compares the traffic load obtained by a result of the monitoring with a predetermined threshold, thereby determining whether to use the power saving mode. For example, the traffic load may be measured as a ratio corresponding to a maximum traffic capacity of the BS to a normalized amount of resources being used.

The power controller 220 determines to allocate power for each radio resource, with reference to whether it uses the power saving mode, and informs the transmission/reception unit 240 of an allocation result. The resource allocator 230 allocates corresponding radio resources to each MS connected to the BS, with reference to whether it uses the power saving mode, and informs the transmission/reception unit 240 of an allocation result. The transmission/reception unit 240 is connected to Tx antennas, includes a plurality of transmission paths including a filter, a Power Amplifier (PA), and such, and performs communication with the MSs, based on the allocation results.

In order to enable the power controller 220 and the resource allocator 230 to determine whether the power saving mode is used, a traffic load that receives a service from the BS may be representatively used. The traffic load is determined based on the number of MSs that are receiving a service from the BS and a traffic quantity that should be provided to each MS.

When the power saving mode is determined to be used, the BS may switch from the MIMO mode to the SIMO mode or limit the number of allocable Resource Blocks (RBs) to a predetermined value because the SIMO mode, which uses only one Tx antenna and one transmission path, has relatively low power consumption in comparison with the MIMO mode, which uses a plurality of Tx antennas and a plurality of transmission paths including an amplifier, a filter, and such, required according to the plurality of Tx antennas. Furthermore, as the number of RBs allocated for communication increases, the PA bias power required also increases. Therefore, the number of allocable RBs is limited to a value equal to or lower than a predetermined value, which is lower than the maximum number of usable RBs, and the PA bias is reduced based on the limited number of RBs, such that it is possible to reduce power consumption of the BS.

Figure 3:
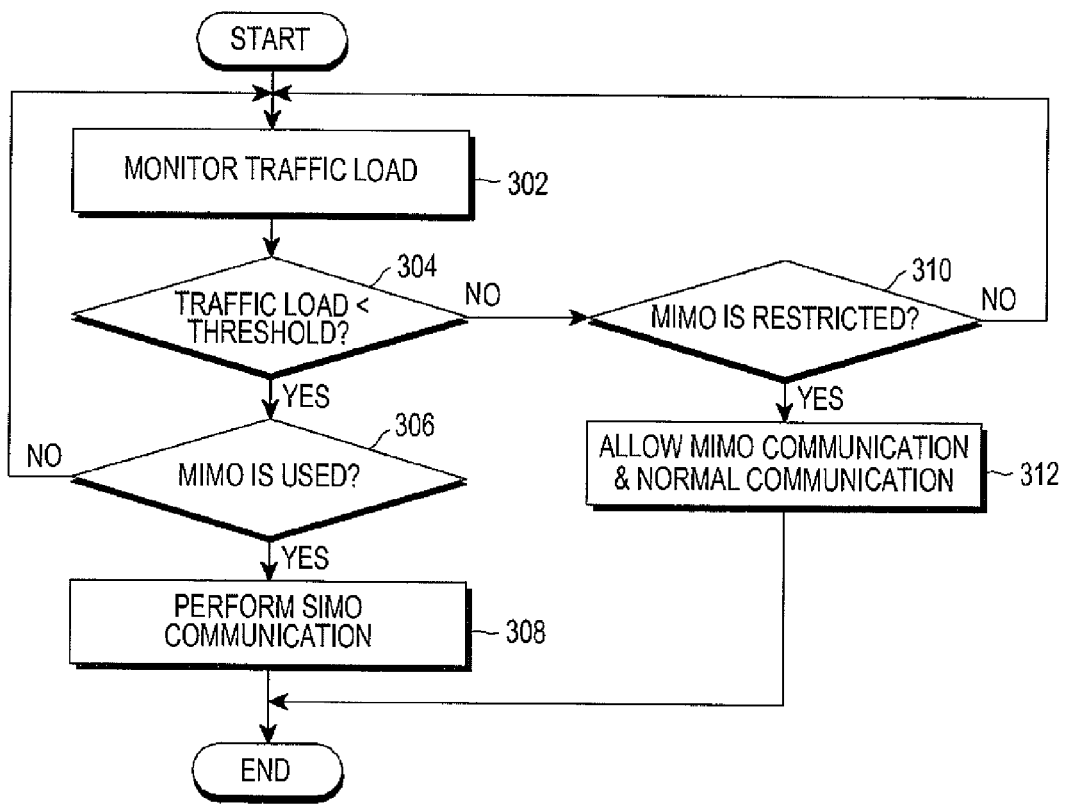
FIG. 3 illustrates a power saving process of a BS according to an embodiment of the present invention.

FIG. 3 illustrates a power saving process of a BS according to an embodiment of the present invention. The embodiment shown in FIG. 3 illustrates a situation in which the BS performing a downlink transmission by using the MIMO mode converts its transmission method to the SIMO mode in order to save power.

Referring to FIG. 3, in block 302, the power saving determiner 210 continuously monitors a traffic load transmitted from the BS. In block 304, the power saving determiner 210 determines whether the traffic load measured by a result of the monitoring is greater than or equal to a threshold. If the traffic load is less than the threshold, in block 306, the power saving determiner 210 determines whether the MIMO mode is currently being used to communicate with the MS. If the MIMO mode is not currently used (i.e., if the SIMO mode is currently used), the process returns to block 302. Alternatively, if the MIMO mode is currently being used, in block 308, the power saving determiner 210 commands the power controller 220 and the resource allocator 230 to perform communication with the MS in the SIMO mode.

When the MIMO mode is converted to the SIMO mode due to the traffic load, in the SIMO mode, the following operations are performed in the power controller 220 and the resource allocator 230 to ensure that coverage that was provided under the MIMO mode is maintained.

Power per Reference Signal (RS) tone in the SIMO mode is set substantially identical to that in the MIMO mode.

Power per data tone in the SIMO mode is set identical to the power per RS tone, and the number of RBs used for data in the SIMO mode is limited to a value lower than in the number of RBs that were used for data in the MIMO mode.

Power per control channel tone in the SIMO mode is set to be substantially equal to the power per RS tone, and the number of control channels used in the SIMO mode is limited to a value hat is lower than the number of control channels that were used in the MIMO mode.

When the resource allocator 230 is notified of the allowance of use of the SIMO mode from the power saving determiner 210, the resource allocator 230 allocates radio resources based on the SIMO mode. The transmission/reception unit 240 turns off transmission paths except for one transmission path that was used for the MIMO mode, based on an allocation result of the power controller 220 and the resource allocator 230, and performs a transmission processing in order to communicate with the MS through the remaining transmission path.

In contrast, if the traffic load is not lower than the threshold, in block 310, the power saving determiner 210 determines whether the MIMO mode has been restricted. That is, the power saving determiner 210 determines whether the MIMO mode is compulsorily converted to the SIMO mode due to the previous traffic load. If the MIMO mode has not been restricted, the process returns to block 302. Alternatively, if the MIMO mode has been restricted, in block 312, the power saving determiner 210 informs the power controller 220 and the resource allocator 230 that communication using the MIMO mode has been allowed, for normal communication. The normal communication refers to when the MIMO mode or the SIMO mode is selectively used according to a channel situation of the MSs and a capacity of the BS.

When the power controller 220 and the resource allocator 230 are informed that the MIMO mode is possible to be used, the power controller 220 and the resource allocator 230 determine a power control and a power allocation for each wireless resource, based on the MIMO mode, and the transmission/reception unit 240 performs a transmission processing in order to communicate with the MS, based on an allocation result.

Figure 4:
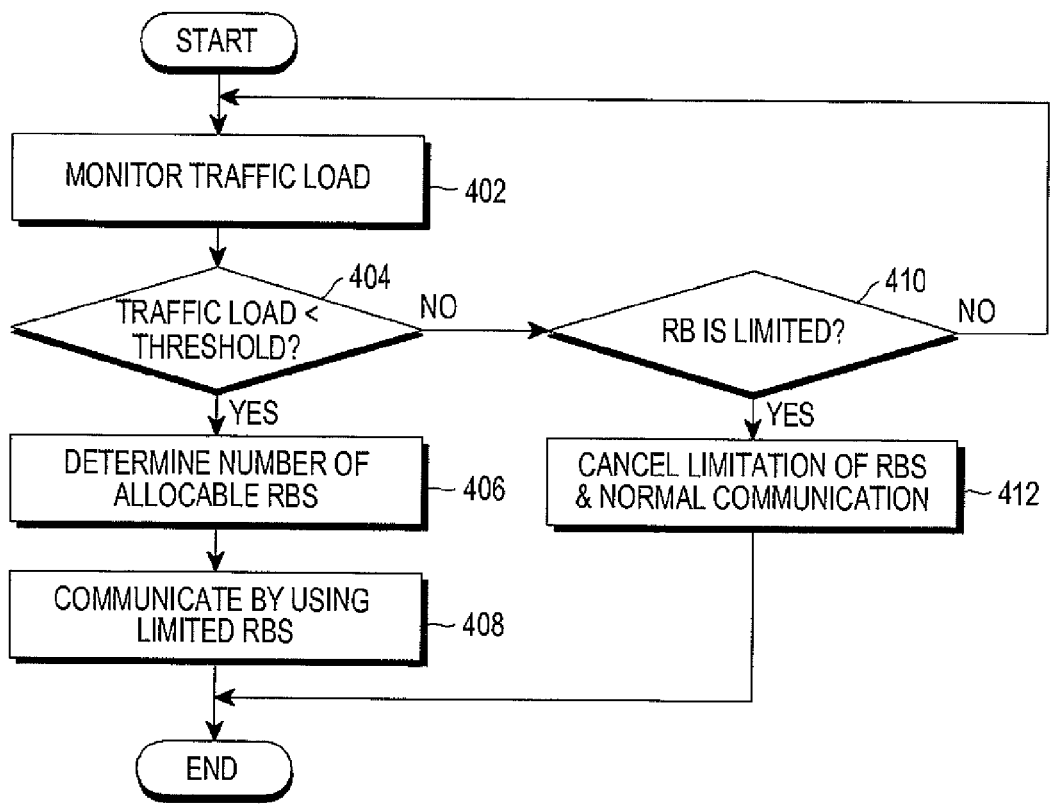
FIG. 4 illustrates a power saving process of a BS according to an embodiment of the present invention.

FIG. 4 illustrates a power saving process of a BS according to an embodiment of the present invention. The embodiment shown in FIG. 4 illustrates a situation in which the number of RBs allocated from the BS is limited and PA bias power is reduced.

Referring to FIG. 4, in block 402, the power saving determiner 210 continuously monitors a traffic load transmitted from the BS. In block 404, the power saving determiner 210 determines whether the traffic load measured by a result of the motoring is equal to or higher than a threshold. If the traffic load is lower than the threshold, in block 406, the power saving determiner 210 determines the number of allocable RBs. For example, the power saving determiner 210 limits the number of RBs that can be allocated for coverage of the BS (i.e., a cell or each of the sectors included in the cell) to a lower value in comparison with a normal operation. For example, when the power saving mode is used, the number of RBs for each sector is limited to the number of RBs that are allocated and currently used. In an embodiment, when the power saving mode is used, the number of RBs for each sector may be limited to 70%, 50%, 30%, and such, of the maximum number of RBs that can be allocated for each sector, and a limitation ratio of the number of RBs may be determined according to a setup by a system operator or a situation of the BS.

In block 408, the resource allocator 230 allocates resources by using a limited number of RBs, and the transmission/reception unit 240 performs communication by using allocated resources. That is, the resource allocator 230 performs a scheduling for allocating a limited number of RBs to the MSs, which are in communication. Furthermore, at this time, a PA bias of a corresponding sector is reduced by a predetermined ratio or a ratio determined by the BS or a host system, based on the limited number of RBs for each sector.

Meanwhile, if the traffic load is not lower than the threshold, in block 410, the power saving determiner 210 determines whether the number of RBs has been limited. That is, the power saving determiner 210 determines whether the number of RBs has been limited due to the previous traffic load. If the number of RBs has not been limited, the process returns to block 402. Alternatively, if the number of RBs has been limited, in block 412, the power saving determiner 210 cancels a limitation of the number of RBs, increases the number of RBs up to a value for normal communication, and informs the resource allocator 230 and the transmission/reception unit 240 of the increased number of RBs, so as to achieve normal communication. The normal communication refers to an operation of the situation in which the RBs are adaptively allocated according to a channel situation of the MSs and a capacity of the BS.

When the resource allocator 230 is informed that the limitation of the number of RBs is canceled, the resource allocator 230 allocates resources without regard to the number of RBs, which can be allocated for each sector, and the transmission/reception unit 240 restores the PA bias with a reduced value to the original state.

Figure 5A:
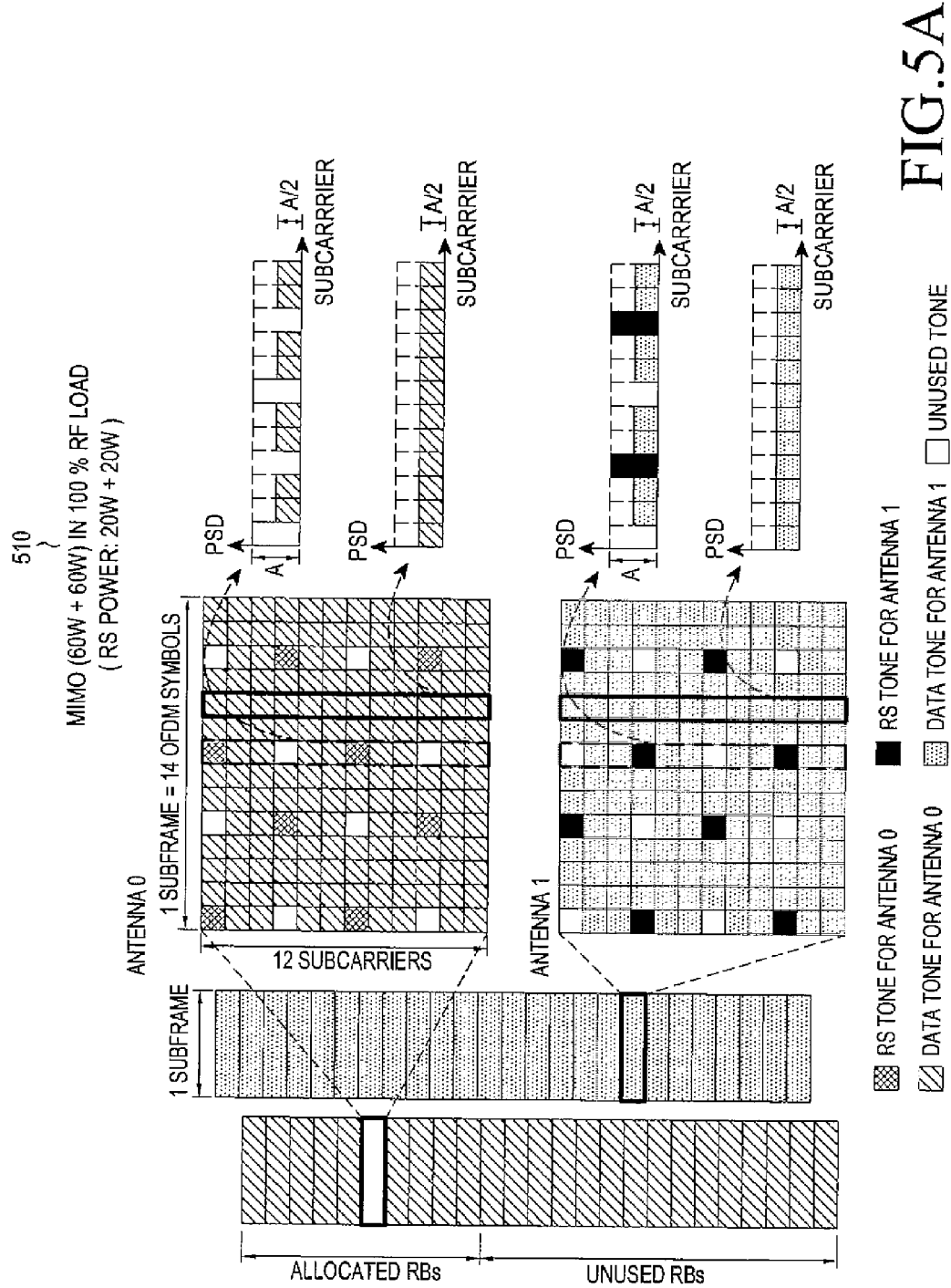
FIGS. 5A and 5B illustrate an operation example of a power saving mode according to an embodiment of the present invention.
Figure 5B:
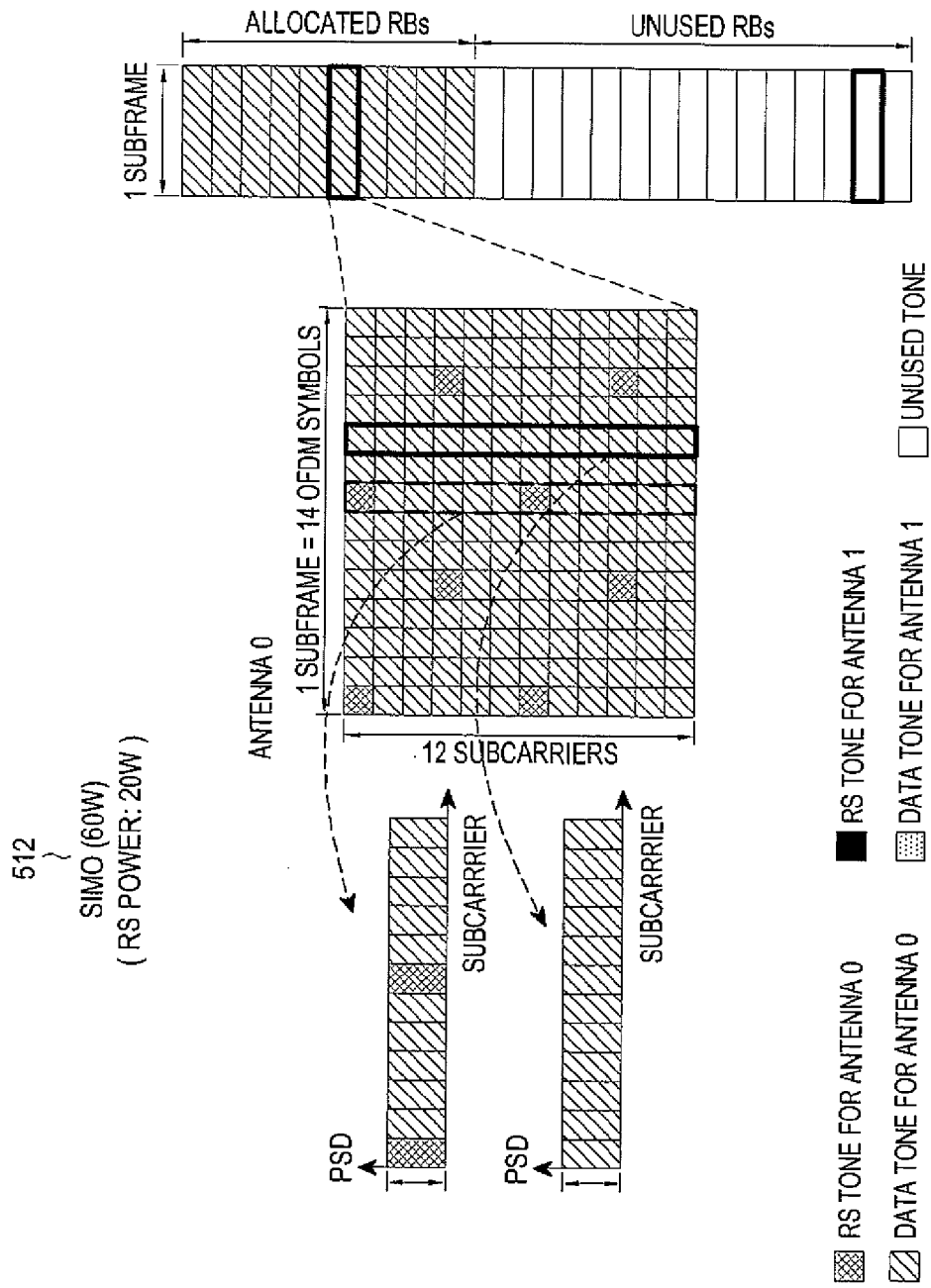

FIGS. 5A and 5B illustrate an example of a power saving mode according to an embodiment of the present invention. FIGS. 5A and 5B illustrate a power saving operation in a situation to which all the aforementioned embodiments of FIG. 3 and FIG. 4 are applied.

As illustrated in FIGS. 5A and 5B, on a frequency axis, a 5 MHz bandwidth is divided into 25 RBs that include 12 subcarriers, respectively, and on a time axis, one subframe includes 14 Orthogonal Frequency Division Multiplexing (OFDM) symbols. A unit of each resource that includes one subframe and one RB is allocated to antenna 0 or antenna 1, and RS tones are positioned on a place defined by RS patterns that are different from each other according to the antenna, in a unit of each resource. The remaining tones are used for data.

Referring to FIG. 5A, when a traffic load is equal to or higher than a threshold, a 2*2 MIMO mode 510 is used, and all of the 25 RBs can be used. Further, through each antenna, the RS tones are transmitted with a Power Spectral Density (PSD) of A, and data tones are transmitted with a PSD of A/2.

Referring to FIG. 5B, when the traffic load is lower than the threshold, a transmission method is converted to a 1*2 SIMO mode 512, and the number of allocable RBs is limited to ten. In addition, through the antenna, the RS tones and the data tones are transmitted with the same PSD of A.

In comparison with FIG. 5A and FIG. 5B, when 100% of the traffic load is used, the MIMO mode uses 120 W, and when the traffic load lower than the threshold is used, the SIMO mode uses 60 W, thereby reducing the power consumption by 50%. In the SIMO mode, the entire power of the RS tones used in one antenna in order to satisfy the same coverage as the MIMO mode is 20 W, which is the same as that in the MIMO mode.

Accordingly, the present invention has been made to solve the problem of using more power than necessary when a traffic load is low in the BS of the wireless communication system. That is, the power used when the traffic load is low in the BS may be reduced through the use of a technique of the present invention.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for saving power in a base station of a wireless communication system, the method comprising:
    monitoring a traffic load of the base station;
    when the traffic load is lower than a predetermined threshold and a Multiple Input Multiple Output (MIMO) mode is used to communicate with a mobile station, converting from the MIMO mode to a Single Input Multiple Output (SIMO) mode; and
    performing communication with the mobile station by using the SIMO mode.

2. The method as claimed in claim 1, wherein performing the communication comprises:
    setting power per Reference Signal (RS) tone in the SIMO mode to be substantially equal to the MIMO mode,
    setting power per data tone in SIMO mode to be substantially equal to the power per RS tone, and
    setting power per control channel tone in the SIMO mode to be substantially equal to the power per RS tone.

3. The method as claimed in claim 1, wherein performing the communication comprises limiting a number of control channels used in the SIMO mode to a value lower than used in the MIMO mode.

4. The method as claimed in claim 1, further comprising determining whether the traffic load is equal to or higher than the threshold during the communication using the SIMO mode; and
    when the traffic load is equal to or higher than the threshold, converting from the SIMO mode to the MIMO mode and performing communication with the mobile station by using the MIMO mode.

5. The method as claimed in claim 1, wherein the traffic load is based on at least one of a number of calls, an amount of resources allocated to each call, a ratio of a maximum traffic capacity of the BS to a normalized amount of resources being used, a number of MSs that are receiving a service from the BS, and a traffic quantity provided to each MS.

6. The method as claimed in claim 1, wherein the traffic load is based on an amount of resources allocated to each call.

7. An apparatus in a base station of a wireless communication system, the apparatus comprising:
    a power saving determiner configured to monitor a traffic load of the base station, and when the traffic load is lower than a predetermined threshold and a Multiple Input Multiple Output (MIMO) mode is used to communicate with a mobile station, convert the MIMO mode to a Single Input Multiple Output (SIMO) mode; and
    a transmission/reception unit configured to perform communication with the mobile station by using the SIMO mode.

8. The apparatus as claimed in claim 7, further comprising a power controller configured to set power per Reference Signal (RS) tone in the SIMO mode to be substantially equal to the MIMO mode, set power per data tone in the SIMO mode to be substantially equal to the power per RS tone, and set power per control channel tone in the SIMO mode to be substantially equal to the power per RS tone.

9. The apparatus as claimed in claim 8, wherein the power saving determiner is further configured to convert the SIMO mode to the MIMO mode when the traffic load is equal to or higher than the threshold during the communication using the SIMO mode.

10. The apparatus as claimed in claim 7, further comprising a resource allocator configured to limit a number of control channels used in the SIMO mode to a value lower than used in the MIMO mode.

11. The apparatus as claimed in claim 7, wherein the traffic load is based on at least one of a number of calls, an amount of resources allocated to each call, a ratio of a maximum traffic capacity of the BS to a normalized amount of resources being used, and a number of MSs that are receiving a service from the BS, and a traffic quantity provided to each MS.

12. The apparatus as claimed in claim 7, wherein the traffic load is based on an amount of resources allocated to each call.

13. The apparatus as claimed in claim 7, wherein the traffic load is based on a ratio of a maximum traffic capacity of the BS to a normalized amount of resources being used.

14. A base station, comprising:
    a plurality of antennas configured for a Multiple Input Multiple Output (MIMO) mode and a Single Input Multiple Output (SIMO) mode;
    a power saving determiner configured to monitor a traffic load of the base station, and when the traffic load is lower than a predetermined threshold and the MIMO mode is used to communicate with a mobile station, convert the MIMO mode to the SIMO mode; and
    a transmission/reception unit coupled to the plurality of antennas and configured to perform communication with the mobile station by using the SIMO mode.

15. The base station as claimed in claim 14, further comprising a power controller configured to set power per Reference Signal (RS) tone in the SIMO mode to be substantially equal to the MIMO mode, set power per data tone in the SIMO mode to be substantially equal to the power per RS tone, and set power per control channel tone in the SIMO mode to be substantially equal to the power per RS tone.

16. The base station as claimed in claim 15, wherein the power saving determiner is further configured to convert the SIMO mode to the MIMO mode when the traffic load is equal to or higher than the threshold during the communication using the SIMO mode.

17. The base station as claimed in claim 14, further comprising a resource allocator configured to limit a number of control channels used in the SIMO mode to a value lower than used in the MIMO mode.

18. The base station as claimed in claim 14, wherein the traffic load is based on at least one of a number of calls, an amount of resources allocated to each call, a ratio of a maximum traffic capacity of the BS to a normalized amount of resources being used, and a number of MSs that are receiving a service from the BS, and a traffic quantity provided to each MS.

19. The base station as claimed in claim 14, wherein the traffic load is based on an amount of resources allocated to each call.

20. The base station as claimed in claim 14, wherein the traffic load is based on a ratio of a maximum traffic capacity of the BS to a normalized amount of resources being used.

* * * * *